United States Patent Office 3,369,925
Patented Feb. 20, 1968

3,369,925
METHOD OF MANUFACTURING LEATHER SUBSTITUTES AND A PRODUCT OF THE SAME
Hideo Matsushita, Itami, Kazuo Fukada, Takarazuka, and Mamoru Nitta, Toyonaka, Japan, assignors to The Toyo Rubber Industry Co., Ltd.
No Drawing. Filed Mar. 19, 1965, Ser. No. 441,323
Claims priority, application Japan, Mar. 21, 1964, 39/15,536
17 Claims. (Cl. 117—63)

The present invention relates to a method of manufacturing leather substitutes having natural leather-like appearance and feel and closely resembling natural leathers particularly as regards break characteristic in bending, and more particularly to the method of manufacturing leather substitutes which comprises forming coated layer having characteristics required as leather, particularly high moisture vapor permeability, onto fibrous substrate.

Heretofore, many attempts have been made to manufacture leather substitutes, and various types of materials have been commercially produced. Those leather substitutes are ordinarily manufactured by coating polyvinyl chloride, nylon, or polyurethane alone or with additives onto fibrous substrate by various well-known procedures, but satisfactory leather substitutes in all respects have never been either produced or described in the literature up to date. Leather substitutes are not available and do not appear to be known or have been described in the literature, wherein proper breaks are formed on bending, vanish on stretching, and are set only in parts which are bent firmly or repeatedly, like natural leather.

Leather substitutes consist of nylon coated onto a fibrous substrate are adequate as regards tendency to set creases, but they do not form desirable creases when bent weakly. Substitutes consisting of methoxymethylated nylon coated onto plasticized, foamed polyvinyl chloride layers have a soft feel, but differ considerably from natural leather, since they have the aspect of films affixed onto thin coated cotton layers. Though the appearance may be improved to some extent by applying appropriate embossing, their moisture vapor permeabilities are not sufficient generally.

In case of polyurea elastomer, it is possible to carry out various operations without plasticizing, but the leather substitutes of polyurea elastomer have too little tendency to setting crease, like vinyl leather of early days. It may be improved to some extent by employing appropriate polyester urethane prepolymer, but it is not enough to regulate widely and easily the characteristics of coated layer, like the method of the present invention.

The present invention has improved the above described disadvantages of prior leather substitutes. Accordingly, an object of the present invention is to provide a method of manufacturing leather substitutes having appearance and feel especially break characteristics in bending, very similar to natural leathers which can never be attained by individual polymers alone, by using as coating solution a co-precipitate of two kinds of synthetic polymers, that is combining the merits of nylon having good crease setting property and those of polyurea elastomer having the excellent elasticity and toughness required for leathers.

Another object is to provide leather substitute sheets having excellent moisture vapor permeability and other characteristics as required for leather.

A further object is to cover up many flaws of substrate that influence characteristics of the leather substitute by improving coating agent.

The present invention consists in the method of manufacturing leather substitutes which comprises forming a coating solution, by mixing a 5 to 50% solution of at least one polymer based on a polyurea elastomer in an organic solvent which is compatible with an alcohol and water and does not dissolve a polyamide, with a 5 to 25% alcoholic solution of at least one polyamide, in a weight ratio of 1:1/20 to 1, coating the suspended admixture solution onto fibrous substrate, and immersing the coated substrate into water to coagulate the polymer system.

The term "polyurea elastomer" as used herein refers to so-called polyurethane-urea, polyurea or polyurethane elastomer, which is a linear elastic polymer obtained by chain-extending an isocyanate-terminated prepolymer with an organic diamine. The term "polyamide" refers to a polyamide, copolyamide or modified polyamide.

The alcohol is one or mixed alcohols selected from the lower aliphatic alcohols having 1 to 6 carbon atoms.

By the present invention, unexpectedly good results, not achieved in former leather substitutes, have been realized by employing, as coating agent, a solution obtained by mixing a polyurea elastomer and a polyamide, each dissolved in a solvent therefor which is a non-solvent for the other, the solutions being compatible with each other and also being thoroughly miscible with water. It is undesirable, for the purposes of the present invention, that a common solvent, dissolving both the polyurea elastomer and the polyamide, be employed as solvent for the coating solution, because the result would be to impair the feel to some extent owing to the elasticity of the polyurea elastomer, and because unnatural creases due to the polyamide and set on firmly bending would be rather emphasized. In the present invention, when two solutions prepared by dissolving separately a polyurea elastomer in a solvent selected from N,N-dimethylformamide, N,N-dimethylacetamide, dimethylsulfoxide, etc. and a polyamide in a calcium chloride-methanol solution (or a copolyamide or a methoxymethylated polyamide in an alcohol alone), are mixed with vigorous stirring, a muddy solution is obtained. The said solution is coated onto a fibrous substrate, e.g. a fabric pretreated with a polyurea elastomer in order to settle down its napping face, and subsequently the coated substrate is immersed into water to coagulate the coated mass or polymer solution on the substrate. After it is washed with water and dried, it is passed through any embossing roll, then it is spray-coated or dressed by means of conventional leather finishing procedures to form the moisture vapor-permeable leather-like sheet which can be given preferable creases on bending or folding and has appearance and feel resembling closely natural leather. These features may be due to co-precipitation effect of two different polymers in the admixture solution which is prepared in the form of a colloidal or muddy dispersion.

This co-precipitation effect is apparently understood from the facts that usually, a polyamide starts to precipitate or nucleate more rapidly than a polyurea elastomer in an admixed solution prepared from each polymer, each in a solvent which is a non-solvent for the other, and when the said partly precipitated or nucleated colloidal solution is introduced into water, polymers can precipitate to grow up around the nuclei or fine particles to form a microporous mass as the whole. Tendency of setting crease depends largely upon composition or construction of a coating layer, as aforementioned, but the shape of crease may be largely influenced also by construction of a substrate beneath it. Namely, when the so-called neutral line, where neither stretch nor compression occurs in bending a material with its grain face inside, stands nearer to the surface, finer creases are generally formed. On the other hand, when the neutral line is farther from the surface, i.e. nearer to middle phase between both faces, owing to unbalance of modulus between a substrate and coating mass, unnatural creases may appear.

However, the coating layer according to the present invention has advantages that a uniform and unique construction through surface to inside of the coated mass is very much controllable by varying in flexibility and its toughness in wide range, and hence, even in the case that the neutral line stands far from the surface, large but natural-looking creases are formed and such a preferable break characteristic can cover characteristic of substrate.

In the next phase, embodiments of the present invention are described.

Polyurea elastomer solution employed herein may be, for example, prepared by the reaction of a polyalkylene ether glycol or a polyester glycol having an average molecular weight of 400 to 5,000 with a molar excess of organic diisocyanate to form an isocyanate-terminated prepolymer, dissolving the prepolymer in solvent such as anhydrous N,N-dimethylformamide and adding dropwise a solution of an organic diamine in a solvent (or partly substituting with an organic monoamine such as di-n-butylamine as a regulating agent) substantially equivalent to free isocyanate in the prepolymer. An appropriate concentration of a polyurea elastomer solution is in a range of 5 to 50%. Polyamide solution employed in the present invention may be obtained by dissolving with heating a polyamide containing 6 to 10 average carbon atoms between nitrogen atoms of main chain, in an alcohol having 1 to 3 carbon atoms, in the presence or absence of calcium chloride. Suitable concentration is in a range of 5 to 25%.

In mixing a polyamide solution with a polyurea elastomer solution, it is preferable to pour the polyamide solution into the polyurea elastomer solution under vigorous stirring for example by means of "homomixer" which agitates locally at high speed.

It is necessary to select an appropriate mixing ratio of polyamide solution to polyurea elastomer solution so that each characteristic of both solutions may be harmonized to obtain good co-precipitation effect. An excess amount of polyamide brings about brittle coating mass and loses entirely leather-like characteristics, while an excess amount of polyurea elastomer prevents from improving break characteristics, which is one of the main objects of the present invention.

According to the present invention, the polyamide solution is employed in a weight ratio of 1/20 to 1 to the polyurea elastomer solution.

Various additives may be added according to requirements, preferably on the side of a polyurea elastomer solution. And up to 40% by weight (calculated in solid content) of a polyurea elastomer may be replaced by other polymers in order to regulate processibility or physical properties, provided that the additional polymer solution does not precipitate any other polymers.

As examples of such polymers, there may be mentioned polyvinyl chloride or its copolymer, polyacrylonitrile or its copolymer, cellulose acetate butyrate, cellulose acetate, epoxy resin, nitrile rubber, etc.

Pigments are usually incorporated in a polyurea elastomer solution. The mixed polymer solution has thixotropic nature and rather differs from a usual polymer solution. Because the fine precipitates produced on co-precipitating or admixing are very lyophilic and the particles are weakly associated with one another but not so much as to cause coagulation, they seem to be very apt to form gel structure. Accordingly, the solution loses fluidity on standing for from a few minutes to scores of hours apart from humidity, but this is not prejudicial from the viewpoint of processibility because the fluidity can be recovered by reactivation.

It may be mentioned as one of advantages of the present invention that while polyurea elastomer coating solution, when exposed to open air, often separates into two liquid phases within few minutes, the mixed solution of the present invention may be used after at least one to three hours as far as it is gently agitated without a break. The mixed polymer solution agitated at high-speed is usually deaerated under reduced pressure prior to coating.

Fibrous substrate is preferably pre-treated with a polymer. Substrate may be treated by means of the known art, namely heat sensitive coagulation method, by elastomer emulsion such as polyacrylic emulsion, NBR latex, etc., but wet coagulation method gives the best result wherein mixed polymer solution of the present invention, solution of polyurea elastomer alone, or elastomer solution such as NBR, chloroprene rubber, etc. may be employed.

The solution of the present invention has further advantage that it loses fluidity rapidly in water and then coagulates to form a mass. On the contrary, it is not much influenced by humidity in the atmosphere until it is put into water after the coating operation. The temperature for coagulating the coated polymer in water is preferably below 50° C., at least within initial five minutes. The coating mass coagulated in water is dried after removing or extracting entirely all the solvent in the solution by washing with water. Then the thus-dried product is finished, according to the object, by means of ordinary processes, i.e. embossing and top dressing similar to that of leather. The leather substitutes according to the present invention possess not only many satisfactory properties such as moisture vapor permeability, flexibility, crumpling resistance, abrasion resistance, and scuff resistance required for leather material, but also appearance and feeling, above all such break characteristics resembling closely natural leather that could never be achieved in any prior artificial articles. They are useful for many applications, particularly for shoe uppers.

The present invention may be explained more concretely in the following examples.

*Example 1*

200 g. of a prepolymer having terminal isocyanate groups at both ends, obtained by the reaction of a polypropylene glycol having an average molecular weight of 1,500 and diphenylmethane-4,4'-diisocyanate in a molar ratio of of 1:2, for 2 hours at 80° C., is dissolved in 350 ml. of N,N-dimethylformamide dehydrated with molecular sieves, under agitating at 40° C. for 30 minutes, and cooled. 30 g. of N,N-dimethylformamide containing 10% by weight of hydrazine-hydrate is added into the prepolymer solution to form a solution having a viscosity of 11,000 cps. at 25° C. ("polymer A solution").

Then, to 112 parts by weight of the said polymer A solution is added 40 parts by weight of a solution obtained by dissolving vinyl chloride/acrylonitrile (60/40) copolymer in the three-fold weight of N,N-dimethylformamide under heating, and then there is further added 4 parts by weight of a solution obtained by dissolving polyvinyl chloride containing 50% by weight of pigment in the four-fold weight of N,N-dimethylformamide. The whole solution is mixed to entirely homogeneous solution ("polymer B solution"). On the other hand, "polymer C solution" is prepared by dissolving commercial copolyamide chips for molding in four-fold weights of hot methanol, and "polymer D solution" is similarly prepared by dissolving under reflux with agitating for several hours 6-nylon chips for molding in equal part of calcium chloride and three-fold parts of methanol.

The following weight ratio of nylon solution, i.e. polymer C or D solution is poured into the said polymer B solution, which is being agitated by means of a high-sheared homomixer, and the mixed solution (I) and the mixed solution (II) are obtained.

| Formulation | Mix. soln. (I) | Mix. soln. (II) |
| --- | --- | --- |
| Polymer B solution | 75 parts by weight | 75 parts by weight. |
| Polymer C solution | 20 parts by weight | |
| Polymer D solution | | 20 parts by weight. |

(Separately, a suede fabric has been previously treated by impregnating with the polymer A solution, immersing into water to coagulate, and then, after drying, being made smooth by means of flat polished plate.)

The mixed solution (I) and (II) are coated on thus-prepared substrates, respectively, soon after they are thoroughly defoamed without filtering. The coating method can be carried out as follows: upon a wet glass plate is placed the said substrate with nap side up or down and held down with suitable iron frame (0.5 to 2.0 mm. in thickness), and the above mixture solution is poured on it. Thickness is adjusted against the said frame by means of a glass bar. The said coated substrate with glass plate is dexteriously put into water bath and is allowed to stand still. After about five minutes, the coated material is taken off the frame and glass plate and further kept in the bath. Many coated materials of various thickness are successively prepared, allowed to stand overnight in the bath, and thereafter dried in a jet-oven equipped with tenter. Those products are pressed for a few minutes by means of a flat polished plate, spray-coated with a lacquer for leather incorporated with pigment, and dried. Comparing the characteristics of leather substitutes thus obtained, the product employing the mixed solution (II) sets creases more easily than that employing mixed solution (I).

This feature is considered to be the effect of calcium chloride. (It is also confirmed that tendency to set creases become larger, as calcuim chloride is added into a copolyamide solution.)

There are formed larger creases in the leather substitutes when coated onto the nap side than when coated onto the unnapped side of the suede fabrics.

The materials coated onto the unnapped side of the substrates are adequately applicable for men's and ladies' shoes, bags, etc.

Some properties of leather substitutes of the present invention are shown in the following table, wherein they are compared with those of several commercially available articles.

10% by weight of hydrazine-hydrate until it reaches appropriate viscosity. Total amount of the hydrazine solution consumed is 28.5 g. Polyurea elastomer solution thus obtained has a viscosity of 3,200 cps. at 25° C. after 24 hours ("polymer F solution").

To 100 parts by weight of a solution of polymer F solution diluted with the twofold weight of N,N-dimethylformamide, is added 10 parts by weight of 25% solution of vinyl chloride/acrylonitrile copolymer (6:4) in N,N-dimethylformamide prepared in Example 1. And while stirring well, 15 parts by weight of 10% methanol solution of copolyamide chips for molding is further added.

This admixture solution is not required to defoam. In the next place, a cotton flannel upon a glass plate is impregnated uniformly with the said admixture solution, and then the impregnated flannel is removed off the glass plate and put into water bath. After standing in the bath for awhile, it is squeezed loosely with rubber roll, dried by means of a drum heater maintained at 130° C. and finally dried in hot air oven at 100° C. The substrate thus obtained is very flexible. Amount of polymer picked up was 60% of the weight of base flannel. On this substrate is coated the mixed polymer solution of the following formulation in a similar manner to Example 1, using glass plate and iron frame.

| In N,N-dimethylformamide | Parts by Weight | |
|---|---|---|
| | III | IV |
| Polymer E solution | 100 | 50 |
| Polymer F solution | | 50 |
| Polyvinyl chloride (10% soln.) | 20 | 50 |
| Vinyl chloride-acrylonitrile copolymer (25% soln.) | | |
| Copolymerized nylon (20% soln. in methanol) | 25 | 25 |

Iron frame of 0.5 mm. in thickness has been employed in coating. The coated substrates are put into water bath, withdrawn from it after 20 hours' immersion, and dried over jet-oven. Subsequently they were pressed with embossing plates of various patterns at 130° C. for a few

TABLE.—COMPARISON OF VARIOUS PROPERTIES OF LEATHER-LIKE MATERIALS.

| Specification | A Co. article | B Co. article (I) | B Co. article (II) | C Co. article | D Co. article | The present article | Calf | Steer |
|---|---|---|---|---|---|---|---|---|
| Coating Polymer | Nylon | Nylon | PVC | PVC | PV | Nylon, PV | | |
| Treating method | CaCl₂ method. | CaCl₂ method. | Forming method. | Foaming method. | Spreading method. | Wet treating method. | | |
| Resistance to water (min.) 1 m. Head. | >30 | >30 | >30 | 0.03 | >30 | >30 | >30 | >30. |
| Moisture Vapor permeability, g. water/m.² day, 40° C. | 678 | 1061 | 178 | 403 | 1,050 | 1,097 | 895 | 665. |
| Coating amount (g./m.²) | 130 | 177 | 363 | 493 | 170 | 210 | | |
| Thickness (mm.) | 0.92 | 1.01 | 0.91 | 1.29 | 0.76 | 1.46 | 1.38 | 2.03. |

"CaCl₂ method" refers to a method which comprises dissolving polyamide into methanol solution containing calcium chloride, coating the polyamide solution thus obtained drying, and subsequently extracting the salt with hot water.
PVC: Polyvinyl chloride (containing plasticizer).
PV: Polyurethane/urea elastomer.
Resistance to water is defined as time capable of resisting against the water pressure of one meter, and its end point is determined as a time when water is sweat out on back side or leather article starts to be wet. Measurement has been finished up after 30 minutes.
Moisture Vapor permeability is represented by g. water per square meter per day at 40° C.
The data of "the present article" are obtained from the product derived from the mixed solution (I) in Example 1.

*Example 2*

179 g. of a prepolymer, obtained by the reaction of a polytetramethylene-etherglycol having an average molecular weight of 1290 and diphenylmethane-4,4′-diisocyanate in a molar ratio of 1:2 at 70° C. for 2 hours, is dissolved at a room temperature in 705 g. of N,N-dimethylformamide dried over molecular sieves. Soon after dissolution, to the above solution is added 20 g. of N,N-dimethylformamide containing 10% by weight of hydrazine-hydrate, and a solution having a viscosity of 28,000 cps. at 25° C. is obtained ("polymer E solution"). 156 g. of a prepolymer which is obtained by the reaction of a polypropylene ether glycol having an average molecular weight of 1,060 and diphenylmethane-4,4′-diisocyanate in a molar ratio of 1:2 at 80° C. for 2 hours, is dissolved in 610 g. of N,N-dimethylformamide dried over molecular sieves, and to the above solution, is slowly added dropwise N,N-dimethylformamide solution containing seconds and sprayed with a solution obtained by admixing commercial polyacrylic emulsion for leather (40% of solids content), paste of titanium oxide (ca. 68% of solids content) and aqueous solution of casein (10%) in a weight ratio of 1:1:0.3 and diluting with an equal amount of water to the total solution. After being dried in a hot air oven at 60° C. for 30 minutes, they are finished by spraying transparent lacquer for leather.

Both III and IV give moisture vapor-permeable leather substitutes possessing soft feel and break characteristics resembling closely natural leather.

What we claim is:

1. A method of manufacturing leather substitutes, which comprises preparing a colloidal coating mixture by admixing a 5 to 50 percent solution of an elastomer selected from the group consisting of polyurethane-urea, polyurea and polyurethane, the solvent for the polymer being miscible with an alcohol and water and being nonsolvent for polyamide, with a 5 to 25 percent alcoholic solution of a polyamide in the dry weight ratio of 1:1/20 to 1, coating the obtained colloidal admixture onto a fibrous substrate, and subsequently treating the coated substrate by immersing in water to form a product having a microporous coating.

2. The method of claim 1, wherein the elastomer has been obtained by reacting a reaction intermediate of a polyalkyleneetherglycol having an average molecular weight of 400 to 5,000 and an excess of an organic diisocyanate with an organic diamine.

3. The method of claim 1, wherein the elastomer has been obtained by reacting a reaction intermediate of a polyesterglycol having an average molecular weight of 400 to 5,000 and an excess of an organic diisocyanate with an organic diamine.

4. The method of claim 1, wherein the solvent for the polymer is a solvent selected from the group consisting of N,N-dimethylformamide, N,N,-dimethylacetamide, dimethylsulfoxide, tetrahydrofuran, and acetonitrile.

5. The method of claim 1, wherein the alcohol is at least one aliphatic alcohol having 1 to 3 carbon atoms.

6. The method of claim 1, wherein the coating solution comprising the elastomer has been prepared by admixing with water until a substantially colloidal admixture is obtained.

7. The method of claim 1, wherein the coating solution comprising the elastomer has been prepared by admixing with an alcohol until a substantially colloidal admixture is obtained.

8. The method of claim 1, wherein the fibrous substrate is a fabric.

9. The method of claim 1, wherein the fibrous substrate is a fabric treated previously by impregnating with a solution of an elastomer, and coagulating the elastomer in a liquid, which is a non-solvent for the elastomer and is miscible with the solvent for the elastomer.

10. The method of claim 1, wherein the fibrous substrate is a non-woven mat treated previously with a solution of an elastomer.

11. The method of claim 1, wherein the fibrous substrate is a non-woven mat treated previously by impregnating with a solution of an elastomer, and coagulating the elastomer in a liquid which is a non-solvent for the elastomer and is miscible with the solvent for the elastomer.

12. A method of manufacturing leather substitutes, which comprises preparing a colloidal coating mixture by admixing a 5 to 50 percent solution of an elastomer selected from the group consisting of polyurethane-urea, polyurea and polyurethane, the solvent for the polymer being miscible with an alcohol and water and being non-solvent for copolyamide, with a 5 to 25 percent alcoholic solution of a copolyamide in the dry weight ratio of 1:1/20 to 1, coating the obtained colloidal admixture onto a fibrous substrate, and subsequently treating the coated substrate by immersing in water to form a product having a microporous coating.

13. The method of claim 12, wherein copolyamide is a copolyamide from 6- and 6,6-polyamide.

14. The method of claim 12, wherein copolyamide is an N-alkoxylated polyamide.

15. A method of manufacturing leather substitutes, which comprises preparing a colloidal coating mixture by admixing a 5 to 50 percent solution of an elastomer selected from the group consisting of polyurethane-urea, polyurea and polyurethane, the said solution being a mixture with a compound which is compatible with the polyurea elastomer and is substantially soluble in a solvent for the polyurea elastomer which solvent is miscible with an alcohol and water and is non-solvent for polyamide, with a 5 to 25 percent alcoholic solution of a polyamide in the dry weight ratio of 1:1/20 to 1, coating the obtained colloidal admixture onto a fibrous substrate, and subsequently treating the coated substrate by immersing in water to form a product having a microporous coating.

16. The method of claim 15, wherein the compound is a vinyl polymer selected from the group consisting of polyvinyl chloride, polyacrylonitrile, and copolymers of vinylchloride and acrylonitrile.

17. A leather substitute having a coating layer on a fibrous substrate, the said coating layer comprising a microporous coating which is prepared by admixing a 5 to 50 percent solution of an elastomer selected from the group consisting of polyurethane-urea, polyurea and polyurethane, the solvent for the polymer being miscible with an alcohol and water and being non-solvent for polyamide, with a 5 to 25 percent alcoholic solution of a polyamide in the dry weight ratio of 1:1/20 to 1 and immersing in water.

References Cited
UNITED STATES PATENTS

| | | | |
|---|---|---|---|
| 3,000,757 | 9/1961 | Johnston et al. | 117—63 |
| 3,100,721 | 8/1963 | Holden | 117—63 |
| 3,190,766 | 6/1965 | Yuan | 117—63 |
| 3,275,468 | 9/1966 | Aoki | 117—140 |

FOREIGN PATENTS

| | | |
|---|---|---|
| 10,744 | 6/1963 | Japan. |

MURRAY KATZ, *Primary Examiner.*